United States Patent
Kuo

(10) Patent No.: US 8,143,864 B2
(45) Date of Patent: Mar. 27, 2012

(54) BATTERY CHARGER WITH OVERVOLTAGE PROTECTION CIRCUITRY

(75) Inventor: Chih-Yuan Kuo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 397 days.

(21) Appl. No.: 12/426,283

(22) Filed: Apr. 20, 2009

(65) Prior Publication Data
US 2010/0181968 A1 Jul. 22, 2010

(30) Foreign Application Priority Data
Jan. 16, 2009 (CN) .......................... 2009 1 0300215

(51) Int. Cl.
*H02J 7/06* (2006.01)
(52) U.S. Cl. ....................................... 320/163; 320/162
(58) Field of Classification Search .................. None
See application file for complete search history.

(56) References Cited

U.S. PATENT DOCUMENTS

| | | | | |
|---|---|---|---|---|
| 6,362,603 B2* | 3/2002 | Suzuki et al. | ................. | 320/163 |
| 7,528,584 B2* | 5/2009 | Regazzi et al. | ................. | 322/28 |
| 2002/0027758 A1* | 3/2002 | Oglesbee et al. | ............. | 361/104 |
| 2005/0024017 A1* | 2/2005 | Lohr | ............................. | 320/128 |
| 2008/0054843 A1* | 3/2008 | Liu | ............................... | 320/107 |
| 2008/0169784 A1* | 7/2008 | Chung et al. | .................. | 320/101 |
| 2009/0224726 A1* | 9/2009 | Arai | ............................... | 320/163 |
| 2010/0149702 A1* | 6/2010 | Su et al. | .......................... | 361/56 |

* cited by examiner

*Primary Examiner* — Huy Q Phan
*Assistant Examiner* — Temilade S Rhodes-Vivour
(74) *Attorney, Agent, or Firm* — Altis Law Group, Inc.

(57) ABSTRACT

A battery charger with an overvoltage protection circuitry is electrically coupled to a power source and a battery. The battery charger with the overvoltage protection circuitry includes a switching circuit. The switching circuit comprises a first switching element, a second switching element, a Zener diode, and a resistor. The first switching element includes a first terminal coupled to the power source, a control terminal, and a second terminal coupled to the battery. The second switching element includes a first terminal coupled to the control terminal of the first switching element, a control terminal, and a second terminal coupled to the first terminal of the first switching element. The Zener diode includes a cathode coupled to the control terminal of the second switching element and an anode grounded. The resistor includes a first terminal coupled to the control terminal of the first switching element and a second terminal grounded.

9 Claims, 1 Drawing Sheet

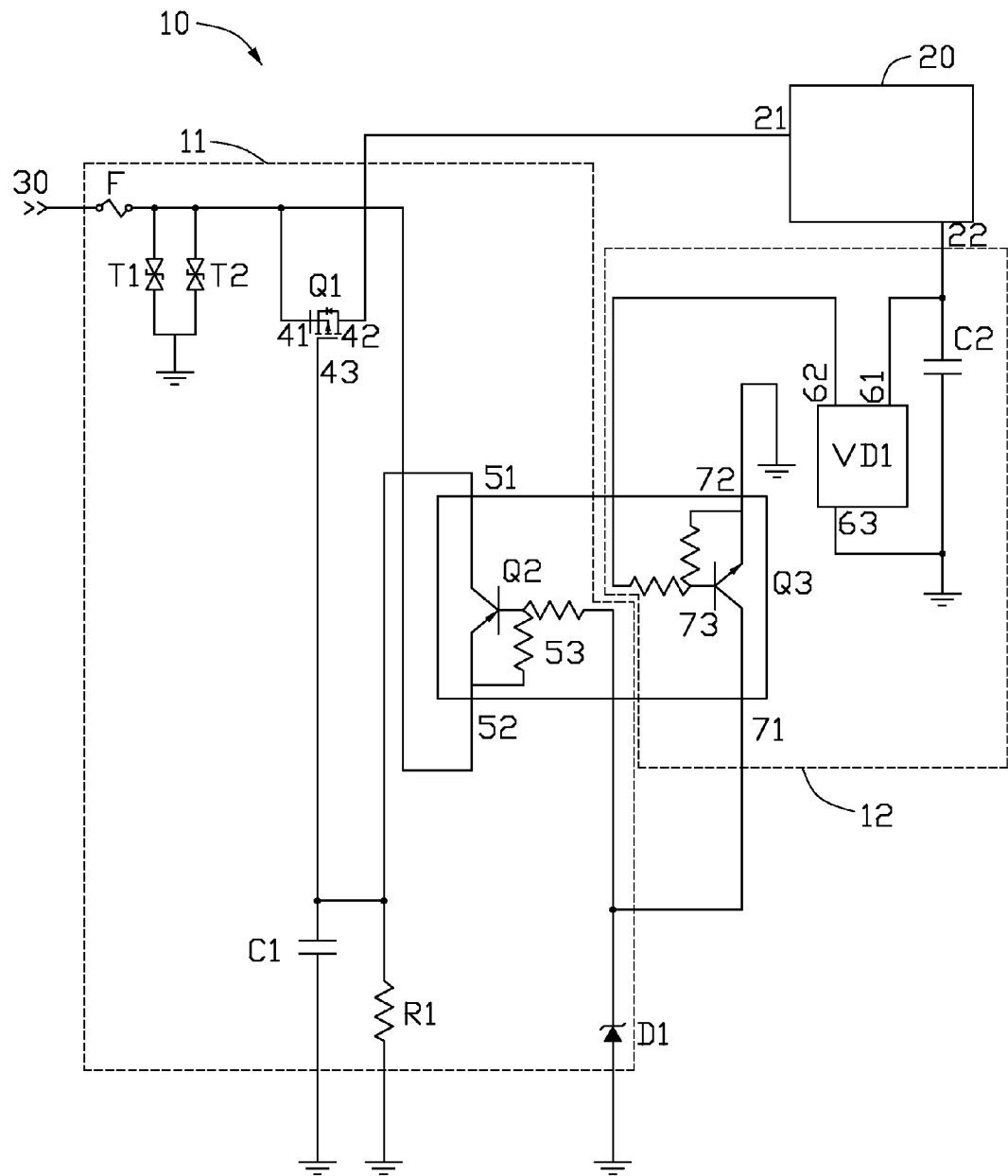

BATTERY CHARGER WITH OVERVOLTAGE PROTECTION CIRCUITRY

BACKGROUND

1. Technical Field

The present disclosure relates to a battery charger with an overvoltage protection circuitry.

2. Description of the Related Art

A typical electronic device uses a rechargeable battery as a power source. When the power of the battery is exhausted, the battery is recharged. During recharging of the battery, the battery charger is usually protected from spikes and other unusually high voltages by overvoltage protection circuitry. However, current overvoltage protection circuits typically include an integrated circuit chip such as a voltage comparison chip, and the inclusion of this chip greatly increases the cost of the overvoltage protection circuitry.

What is needed, therefore, is a battery charger with an overvoltage protection circuitry which can overcome the above-described problem.

BRIEF DESCRIPTION OF THE DRAWINGS

Many aspects of the present battery charger with an overvoltage protection circuitry should be better understood with reference to the accompanying drawing. The components in the drawing are not necessarily drawn to scale, the emphasis instead being placed upon clearly illustrating the principles of the battery charger with an overvoltage protection circuitry.

The FIGURE is a schematic view of a battery charger with an overvoltage protection circuitry in accordance with an exemplary embodiment.

DETAILED DESCRIPTION

Embodiments of the present battery charger with the overvoltage protection circuitry will now be described in detail with reference to the drawing.

Referring to the FIGURE, one embodiment of a battery charger with the overvoltage protection circuitry 10 is used to charge a battery 20. The battery charger with the overvoltage protection circuitry 10 is electrically coupled to a power source 30 and the battery 20. The battery charger with the overvoltage protection circuitry 10 includes a switching circuit 11 and a detecting circuit 12. The battery 20 includes an input terminal 21 coupled to the switching circuit 11 and an output terminal 22 coupled to the detecting circuit 12. In this embodiment, a normal charging voltage of the battery 20 is in a range of: 4.75~5.25 volts (V).

The switching circuit 11 includes a fuse F, two bilateral diodes T1, T2, a first switching element Q1, a second switching element Q2, a Zener diode D1, a resistor R1, and a first capacitor C1.

The fuse F includes an input terminal and an output terminal. The input is coupled to the power source 30.

Each of the two bilateral diodes T1 and T2 includes an input terminal and an output terminal. The input terminals of the bilateral diode T1, T2 are coupled to the output terminal of the fuse F. The output terminals of the bilateral diode T1, T2 are grounded. The breakdown voltage of the bilateral diodes T1, T2 is about 12.5 volts (V).

The first switching element Q1 includes a first terminal 41, a second terminal 42, and a control terminal 43. The control terminal 43 is used to control the connection and disconnection between the first terminal 41 and the second terminal 42. The first terminal 41 is coupled to the output terminal of the fuse F. The second terminal 42 is coupled to the input terminal 21 of the battery 20. In this embodiment, the first switching element Q1 is a p-channel metal oxide semiconductor (p-MOS) transistor, where the first terminal 41 is the source, the second terminal 42 is the drain, and the control terminal 43 is the grid.

The second switching element Q2 includes a first terminal 51, a second terminal 52, and a control terminal 53. The control terminal 53 is used to control the connection and disconnection between the first terminal 51 and the second terminal 52. The first terminal 51 is coupled to the control terminal 43 of the first switching element Q1. The second terminal 52 is coupled to the first terminal 41 of the first switching element Q1. In this embodiment, the second switching element Q2 is an n-channel insulated gate bipolar transistor (n-IGBT), wherein the first terminal 51 is the collector, the second terminal 52 is the emitter, and the control terminal 53 is the base. A turn-on voltage of the second switching element Q2 is about 0.7 volts (V).

The Zener diode D1 includes an anode grounded and a cathode coupled to the control terminal 53 of the second switching element Q2. The Zener voltage of the Zener diode D1 is about 4.5 volts (V).

The resistor R1 includes a first terminal and a second terminal. The first terminal electrically interconnects the control terminal 43 of the first switching element Q1 and the first terminal 51 of the second switching element Q2. The second terminal is grounded.

The first capacitor C1 includes a first terminal and a second terminal. The first terminal electrically interconnects the control terminal 43 of the first switching element Q1 and the first terminal of the resistor R1. The second terminal is grounded.

The detecting circuit 12 includes a comparison element VD1, a third switching element Q3, and a second capacitor C2.

The comparison element VD1 includes an input terminal 61, an output terminal 62, and a ground terminal 63. The input terminal 61 is coupled to the output terminal 22 of the battery 20. The ground terminal 63 is grounded. A comparison voltage of the comparison element VD1 is about 4.4 volts (V).

The third switching element Q3 includes a first terminal 71, a second terminal 72, and a control terminal 73. The control terminal 73 is used to control the connection and disconnection between the first terminal 71 and the second terminal 72. The first terminal 71 is coupled to the cathode of the Zener diode D1. The second terminal 72 is grounded. The control terminal 73 is coupled to the output terminal 62. In this embodiment, the third switching element Q3 is an p-channel insulated gate bipolar transistor (p-IGBT), wherein the first terminal 71 is the collector, the second terminal 72 is the emitter, and the control terminal 73 is the base. The second switching element Q2 and the third switching element Q3 can be packaged in one chip or in two individual chips. A turn-on voltage of the second switching element Q3 is about 0.7 volts (V).

The second capacitor C2 includes a first terminal and a second terminal. The first terminal is coupled to the input terminal 61 of the comparison element VD1. The second terminal is grounded.

In operation, when the voltage of the power source 30 is in a range of the normal charging voltage, e.g., about 5.00 volts (V) in one embodiment, both the first terminal 41 of the first switching element Q1 and the second terminal 52 of the second switching element Q2 is about 5.00 volts (V). As the voltage of the second terminal 52 minus the turn-on voltage of the second switching element Q2 is lower than the Zener voltage of the Zener diode D1, the Zener diode D1 is an open circuit and the second switching element Q2 is off. At this state, the voltage of the control terminal 43 of the first switching element Q1 is about 0 volts (V) and the first switching element Q1 is turned on. Thus the second terminal 42 is electrically connected to the first terminal 41, the voltage of the second terminal 42 is also about 5.00 volts (V). Therefore, the power source 30 charges the battery 20.

In the process of charging, the input terminal 61 of the comparison element VD1 receives the voltage of the battery 20. The comparison element VD1 compares the voltage of the battery 20 with the predetermined comparison voltage. If the voltage of the battery 20 is greater than the predetermined comparison voltage, the output terminal 62 generates a voltage greater than the turn-on voltage of the third switching element Q3. The first terminal 71 is electrically connected to the second terminal 72 of the third switching element Q3, and the voltage of the first terminal 71 changes to about 0 volts (V). The voltage of the control terminal 53 of the second switching element Q2 accordingly changes to about 0 volts (V). The first terminal 51 is electrically connected to the second terminal 52 of the second switching element Q2. The voltage of the control terminal 43 of the first switching element Q1 changes to about 5.00 volts (V). As a result, the first switching element Q1 is off and the battery 20 stops charging.

During the process of charging, when the voltage of the power source 30 exceeds the normal charging voltage, e.g., about 6.00 volts (V) in this embodiment, both the first terminal 41 of the first switching element Q1 and the second terminal 52 of the second switching element Q2 is about 6.00 volts (V). As the voltage of the second terminal 52 minus the turn-on voltage of the second switching element Q2 is greater than the Zener voltage of the Zener diode D1, thus the Zener diode D1 is reverse conducted. The control terminal 53 is becomes grounded through the Zener diode D1, and the first terminal 51 electrically connects to the second terminal 52 of the second switching element Q2. The voltage of the control terminal 43 of the first switching element Q1 changes to about 6.00 volts (V). As a result, the first switching element Q1 is off and the battery 20 stops charging.

In order to provide a safer overvoltage protection to the battery 20, if the voltage of the power source 30 exceeds the breakdown voltage of the bilateral diodes T1, T2, the bilateral diode T1 and/or the bilateral diode T2 will be short-circuits. Therefore the power source 30 is grounded and the battery 20 stops charging.

If the voltage of the power source 30 further increase, the fuse F is blown, and the battery charger with the overvoltage protection circuitry 10 is disconnected from the power source 30.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A battery charger with an overvoltage protection circuitry electrically coupled to a power source and a battery, the battery charger with the overvoltage protection circuitry comprising:
a switching circuit comprising:
a first switching element comprising a first terminal coupled to the power source, a control terminal, and a second terminal coupled to the battery; and
a second switching element comprising a first terminal coupled to the control terminal of the first switching element, a control terminal, and a second terminal coupled to the first terminal of the first switching element; and
a Zener diode comprising a cathode directly coupled to the control terminal of the second switching element and an anode grounded, the cathode being indirectly coupled to the control terminal of the first switching element; and
a resistor comprising a first terminal coupled to the control terminal of the first switching element and a second terminal grounded.

2. The battery charger with an overvoltage protection circuitry as claimed in claim 1, further comprising a fuse, an input terminal of the fuse being coupled to the power source; an output terminal of the fuse being coupled to the first terminal of the first switching element.

3. The battery charger with an overvoltage protection circuitry as claimed in claim 1, further comprising two bilateral diodes, each of the two bilateral diodes comprising an input terminal and an output terminal, the input terminals of the bilateral diodes being coupled to the output terminal of the fuse, the output terminals of the bilateral diodes being grounded.

4. The battery charger with an overvoltage protection circuitry as claimed in claim 1, further comprising a first capacitor, the first terminal of the first capacitor being coupled to the first terminal of the resistor; the second terminal of the first capacitor being grounded.

5. The battery charger with an overvoltage protection circuitry as claimed in claim 1, wherein the first switching element is a p-channel metal oxide semiconductor (p-MOS) transistor, the first terminal being the source, the second terminal being the drain, and the control terminal being the gate.

6. The battery charger with an overvoltage protection circuitry as claimed in claim 1, wherein the second switching element is an n-channel insulated gate bipolar transistor (n-IGBT), the first terminal being the collector, the second terminal being the emitter, and control terminal being the base.

7. A battery charger with an overvoltage protection circuitry electrically coupled to a power source and a battery, the battery charger with the overvoltage protection circuitry comprising:
a switching circuit comprising:
a first switching element comprising a first terminal coupled to the power source, a control terminal, and a second terminal coupled to the battery; and
a second switching element comprising a first terminal coupled to the control terminal of the first switching element, a control terminal, and a second terminal coupled to the first terminal of the first switching element; and
a Zener diode comprising a cathode directly coupled to the control terminal of the second switching element and an anode grounded, the cathode indirectly coupled to the control terminal of the first switching element; and
a resistor comprising a first terminal coupled to the control terminal of the first switching element and a second terminal grounded;
a detecting circuit comprising:
a comparison element comprising an input terminal coupled to the battery, an output terminal, and a ground terminal grounded, and a third switching element comprising a first terminal coupled to the cathode of the Zener diode, a control terminal coupled to the output terminal of the comparison element, and a second terminal grounded.

8. The battery charger with an overvoltage protection circuitry as claimed in claim 7, further comprising a second capacitor, the first terminal of the second capacitor being coupled to the input terminal of the comparison element; the second terminal of the second capacitor being grounded.

9. The battery charger with an overvoltage protection circuitry as claimed in claim 8, wherein the third switching element is a p-channel insulated gate bipolar transistor (p-IGBT), the first terminal being the collector, the second terminal being the emitter, and control terminal being the base.

* * * * *